No. 709,600. Patented Sept. 23, 1902.
E. HILL.
MEASURING DEVICE.
(Application filed Oct. 21, 1901.)
(No Model.)
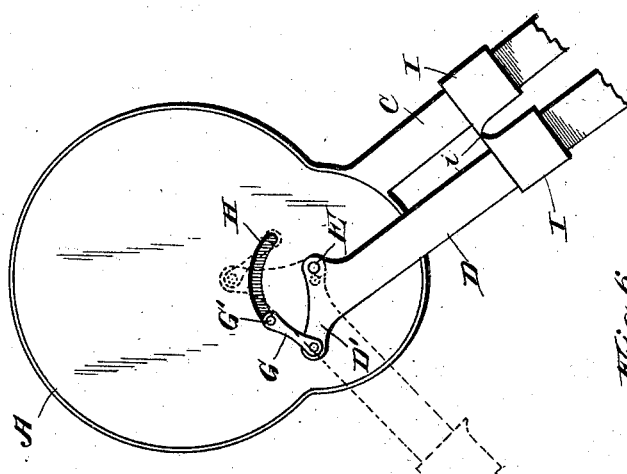
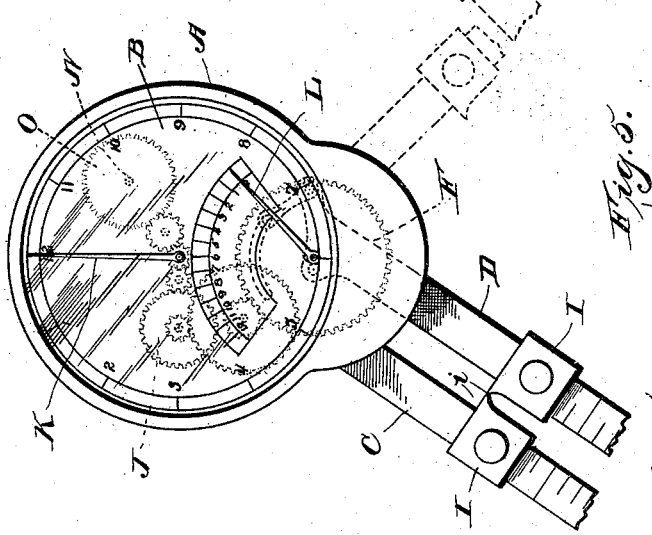
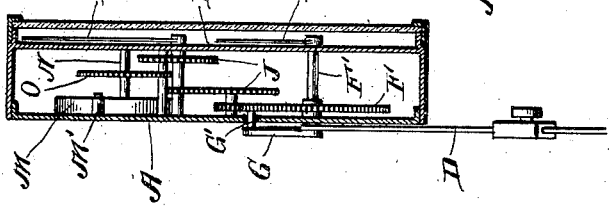
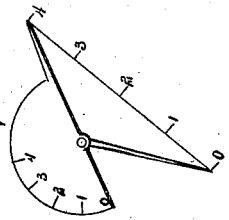
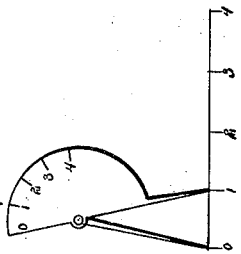
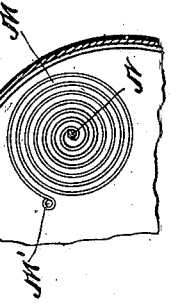
Witnesses:
Louis D. Heinrichs
L. H. Morrison
Inventor
Edgar Hill
By W. Preston Williamson
Atty

UNITED STATES PATENT OFFICE.

EDGAR HILL, OF PHILADELPHIA, PENNSYLVANIA.

MEASURING DEVICE.

SPECIFICATION forming part of Letters Patent No. 709,600, dated September 23, 1902.

Application filed October 21, 1901. Serial No. 79,330. (No model.)

*To all whom it may concern:*

Be it known that I, EDGAR HILL, a citizen of the United States, residing at Philadelphia, county of Philadelphia, and State of Pennsylvania, have invented a certain new and useful Improvement in Measuring Devices, of which the following is a specification.

My invention relates to a new and useful improvement in measuring instruments, and has for its object to provide an instrument of this character by which a drawing made upon a reduced scale can be measured and the full-size measurement of the distance measured upon the drawing will be indicated upon the indicator carried by said instrument, or the instrument may be so constructed as to register upon the indicator the actual distance between the measuring-points.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a face view of the instrument, a portion of the legs being broken away. Fig. 2 is a rear view of the same; Fig. 3, a vertical section; Fig. 4, a detail view showing the coil-spring for taking up lost motion. Figs. 5 and 6 are diagrams illustrating the impossibility of indicating upon a curved line provided with uniformly-spaced graduations the measurement of a straight line in which two legs are pivoted together.

This invention is intended as an improvement upon application for measuring devices filed by me January 2, 1901, Serial No. 41,772, and allowed April 27, 1901. In this former application the instrument shown and described would be impractical for the measuring of straight lines. The instrument as shown could only be utilized for measuring curved lines which were concentric with a pivotal point of the movable leg. The reason the instrument shown in this former application could not be utilized to measure straight lines is that the registering or indicating would be done upon a curved line or the periphery of a circle provided with uniformly-spaced graduations, while the measurement would be taken upon a straight line between the two points. I have endeavored to illustrate this by the diagrams shown in Figs. 5 and 6, in which two legs are pivoted together, and the segments attached to the movable leg has graduation-marks thereon equal distances apart to correspond to equal distances indicated upon the straight line to be measured. It will be seen that if a graduation-mark is placed so it will properly indicate and register the first one of the equal divisions of the straight line other graduations spaced the same distance apart would not register or indicate correctly the other equal divisions. It is shown in Fig. 5, the instrument registering correctly one-quarter of the straight line, and it is shown in Fig. 6 when the legs are spread so as to include the whole of the straight line or the four divisions, and it will be seen that although the divisions upon the segment are equal and the divisions upon the straight line are equal the indicating-hand would point a considerable distance past the four divisions, and this is what would occur in an instrument such as shown and described in my former application, and therefore it could not be utilized for measuring straight lines. In my present invention I have overcome this disadvantage by pivoting the movable leg eccentrically to the arbor of the initial wheel of the train of gears. The distance that this movable leg will be pivoted from the center of the initial gear can be determined by certain mathematical calculations. This eccentrically-pivoted movable leg is connected to the initial gear-wheel by means of the link, and when the leg is pivoted eccentrically at the proper point the initial gear-wheel will be rotated equal distances for equal distances measured upon a straight line by the leg—as, for instance, if the instrument is so constructed that the limit of the movement of the legs will be forty-five degrees from the eccentric center when the legs are open forty-five degrees the initial wheel of the train of gears will have been moved one-quarter of its circumference—and if the legs are so placed as to measure one-half of the distance represented by a straight line between the points when the legs are at forty-five degrees, although the legs when measuring this one-half distance will not stand at twenty-two and one-half degrees, the initial wheel of the train will have been moved twenty-two and one-half degrees, and therefore register only one-half of the distance, as if the legs had been open to the limit or forty-five degrees. The movement of the indicating device is entirely dependent upon the movement of the initial wheel operated upon by the movable leg, and therefore this initial wheel can be made to operate a train of gears, or the indicating may be done directly from the center of such wheel. This does not enter into my present invention, as the essential feature of this application is the pivoting of the movable legs eccentric to the registering-wheel for the purpose of indicating exactly the distance measured upon a straight line.

Referring to the drawings, A represents the casing, which has a dial B located upon the front thereof.

C is a leg which is formed with or secured to the casing A. D is another leg which is pivoted to the back of the casing at the point E.

F is the main or initial gear-wheel of the train of gears for registering the distance measured. This wheel is journaled in the casing upon the arbor F', and this gear-wheel F is adapted to be rotated as the movable leg D is moved. This movable leg D is connected to the gear-wheel F by means of the link G, which is pivoted to the arm D', extending out from the leg D, and the other end of the link is pivoted to a pin G', which passes through a slot H, formed in the casing, and is secured in the gear-wheel F.

I represents sliding pointers adapted to slide upon the legs C and D and be secured in position by means of set-screws. The legs C and D are graduated, so as to set the pointers at different positions for the purpose of measuring drawings of different scales.

$i$ represents the points between which the measurements are taken.

The movable leg D is pivoted to the casing at a point eccentric to the pivotal point of the gear-wheel F, and, as before stated, the distance the movable leg is pivoted from the pivotal point of the gear-wheel can be determined by certain mathematical calculations, and the object of pivoting the movable leg eccentric to the gear-wheel is for the purpose of causing the gear-wheel F to revolve the proper distance for certain measurements made between the points $i$ upon the legs—as, for instance, if it was desired to measure a line divided into four equal parts and one of these parts was measured or included between the points $i$ the gear-wheel would have been caused to revolve just one-quarter of the distance it would revolve if the full four divisions were included between the points $i$, or if one-half of the line is measured the gear-wheel would be caused to travel just one-half of the distance it would travel in measuring the full line, or twice the distance it would travel in measuring one-quarter of the line.

In this invention it is immaterial how the indicating is done upon the dial. The distance may be indicated by two hands, as in my former application, pivoted in the center of the dial, one hand indicating the inches and the other the feet, or it may be accomplished as shown in the drawings, in which the hand indicating the inches is pivoted in the center of the dial and the motion is communicated from the initial wheel F to this hand K through the train of gears J. The feet are indicated by the hand L, which is secured upon the arbor F' of the initial gear-wheel F, and the number of feet the instrument is designed to register are arranged in a segment of a circle concentric with the arbor F', and this hand L will indicate one foot for each revolution of the hand K.

M is a light coil-spring, one end being secured to the casing at M' and the other end secured to the arbor N of a gear-wheel O, which gear-wheel is either geared direct with the gear-wheel upon the arbor to which the hand K is secured or may be geared to such gear-wheel through an intermediate gear O'. The purpose of this spring is to overcome and take up the slight amount of lost motion which might be caused by reason of the use of gears. As the legs are spread the coil-spring will be tightened, and, in fact, the coil-spring will always exert a slight tension upon the train of gears, so as to keep the gear-teeth of one wheel always in contact with the same face of the gear-teeth of the opposing wheel. This spring M will be made very light, so as not to be able to move the movable leg; but the tension will be sufficient to cause the train of gears to be revolved, so that the hand in returning to zero or the normal position will be returned by the spring instead of by the movable leg D when this movable leg is moved toward the stationary leg. Of course this spring may be placed in the same arbor as the hand K, if so desired.

I do not wish to be limited to the exact construction here shown, as slight modifications could be made without departing from the spirit of my invention, as the main object of this application is to protect the fact of the movable leg being pivoted eccentric to the center of the initial recording-wheel, so that the dial would indicate correctly distances measured upon a straight line.

Having thus fully described my invention, what I claim as new and useful is—

1. A measuring instrument, a casing, a dial carried by the casing, hands pivoted in the casing, one hand adapted to record the revolution of the other, a suitable train of gearing for operating the hands, a leg secured to the casing, a second leg pivoted to the casing at a point eccentric to the pivotal point of the initial gear-wheel of the train of gears, a link connecting the movable leg with the initial gear-wheel, the distance the movable leg is pivoted from the pivotal point of the initial wheel to be set so that the dial will register correctly distances measured by the legs upon a straight line, substantially as and for the purpose specified.

2. In a measuring instrument of the character described, a casing, an indicating device carried by the casing, an initial gear-wheel pivoted in the casing and adapted to actuate and control the indicating device, a leg secured to the casing, a second leg pivoted to the casing at a point eccentric to the pivotal point of the initial gear-wheel, an arm D' extending outward from the movable leg, a link pivoted to said arm, a pin carried by the initial gear-wheel, said link connected to said pin, pointers adjustable on the legs, graduations for indicating the scale of the drawing to be measured represented upon the legs, substantially as and for the purpose specified.

3. In a device of the character described, a casing, a toothed wheel journaled within the casing, a leg secured to the casing, a second leg pivoted to the casing at a point eccentric to the pivotal point of the toothed wheel, said movable leg adapted to rotate the toothed wheel equal distances for equal distances measured by the legs upon a straight line, substantially as and for the purpose specified.

4. In combination with a device of the character described, a casing, a dial located upon the front of the casing, a circle of graduations represented upon the dial, a hand pivoted in the center of the dial, a train of gears adapted to actuate said hand, a hand pivoted to the arbor of the initial gear of the train of gears, a series of figures arranged concentric to the pivotal point of the initial gear, the second hand adapted to record the revolutions of the first-named hand, a leg secured to the casing, a second leg pivoted to the casing eccentric to the pivotal point of the initial gear, a connection between the movable leg and the initial gear, pointers located upon each of the legs and adapted to be adjusted along the same, graduations formed upon each of the legs, a coil-spring so set as to be tightened when the legs are separated, substantially as and for the purpose specified.

In testimony whereof I have hereunto affixed my signature in the presence of two subscribing witnesses.

EDGAR HILL.

Witnesses:
 WALTER C. REDDING,
 HORACE C. HARDING.